Aug. 15, 1950  J. H. EAGLE  2,518,671
FOCUSING MECHANISM FOR LENS MOUNTS
Filed May 10, 1947

John H. Eagle
INVENTOR

BY
ATTORNEYS

Patented Aug. 15, 1950

2,518,671

UNITED STATES PATENT OFFICE 2,518,671

FOCUSING MECHANISM FOR LENS MOUNTS

John H. Eagle, Rochester, N. Y., assignor to Eastman Kodak Company, Rochester, N. Y., a corporation of New Jersey Application May 10, 1947, Serial No. 747,276

5 Claims. (Cl. 88—24)

1

The present invention relates to a projecting apparatus, and more particularly to a focusing mechanism for a slide projector.

The principal object of the invention is the provision of a new and simplified arrangement for adjusting the projection lens of a slide projector to focus the image of a slide on a viewing screen.

Another object of the invention is the provision of a lens adjusting or focusing mechanism which is simple in construction, comprises few parts of rugged construction, easy to operate, and highly effective in use.

To these and other ends, the invention resides in certain improvements and combination of parts, all as will be hereinafter more fully described, the novel features being pointed out in the claims at the end of the specification.

In the drawings.

Similar reference numerals throughout the various views indicate the same parts.

Figure 1:
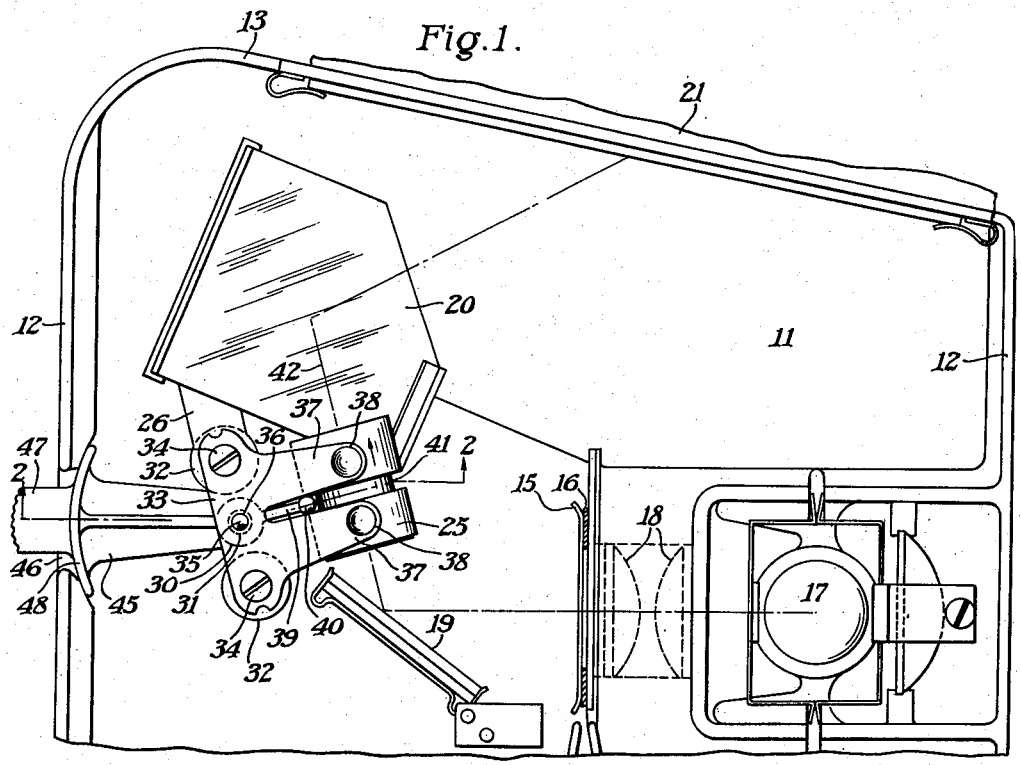
Fig. 1 is a plan view of the main portion of the base of a slide projector, showing the relation of the various parts, and a focusing mechanism constructed in accordance with the present invention.

The focusing mechanism of the present invention is used in connection with a projection apparatus for projecting successively image areas of slides or transparencies on to a viewing screen. The apparatus is formed with a base having a bottom 11, opposite side walls 12, back wall 13 and a front wall, not shown. Slide supply and take-up magazines, not shown, are positioned in front of the base, and a slide changing mechanism, also not shown, is adapted to feed a slide 16 from the supply magazine into a projection gate or holder 15, and, after projection, to withdraw the slide from the gate and feed it into the take-up magazine. As these slide magazines and slide changers may be any standard or suitable construction and do not constitute a part of the present invention, these features are not further described or illustrated.

A lamp 17 carried by the bottom 11 has the rays thereof directed by condenser lenses 18 to the slide 16 in the gate 15 to illuminate the slide, as is apparent. A reflector or mirror 19 is mounted on and extends upwardly from the bottom 11 and is positioned in the path of the light rays

2 transmitted by the slide 16 to reflect the image thereof on a second mirror 20 from which the image is reflected to a third mirror 21. These mirrors are all carried by the base, and the second and third mirrors are tilted relative to the bottom 11 so as to direct the projected image of the slide 16 on to a viewing screen positioned in a housing which rests on and extends upwardly from the base. As the housing and screen do not form a part of the present invention they are not illustrated.

In order that the image of the slide 16 may be properly focused on the viewing screen, a projection lens mount 25 is mounted between the first and second mirrors 19 and 20 and on the optical axis of the projected image of the slide. By moving the lens mount 25 along the optical axis, the image of the slide may be brought to a sharp focus on the viewing screen.

To secure this result, the bottom 11 has extending upwardly therefrom a boss or support 26, the upper edge of which is provided with a pair of spaced guideways 27 which are adapted to receive and to support the mount 25 so that the axis thereof will register with the optical axis of the other optical members. In addition, the guideways 27 guide the mount as it is moved axially during the focusing operation as will be apparent from an inspection of Figs. 2 and 3. The mount is yieldably held in position on the guideways by means to be later described.

A second boss or support 29 also extends upwardly from the bottom 11 and serves to support a vertical stem 30 of a T-shaped focusing member for the mount 25. A single ball bearing 31 is carried in a small recess formed in the upper surface of the boss 29 and provides a support for the lower end of the stem 30, as clearly illustrated in Fig. 2. A pair of posts 32 extend upwardly from the boss 29 on opposite sides of the stem 30, and have their upper ends connected by a metal strip 33 which is connected to the posts 32 by means of screws 34 or other fastening means. A second ball bearing 35 is arranged in vertical alignment with the ball 31 and is received in a recess formed in the upper end of the stem 30 and extends into a registering opening 36 in the strip 33. Thus the balls 31 and 35 are in vertical alignment to provide a vertical axis about which the stem 30 may rotate in a manner and for a purpose to be later described.

The strip 33 has formed integral therewith and projecting laterally therefrom a pair of resilient or spring fingers 37, the free ends 38 of which engage the top of the lens mount 25 to yieldably retain the latter on the guideways 27. Thus the mount is yieldably but lightly held in position on the guideways 27, yet may freely move therealong to adjust the mount to bring the slide image into a sharp focus on the viewing screen.

Figure 2:
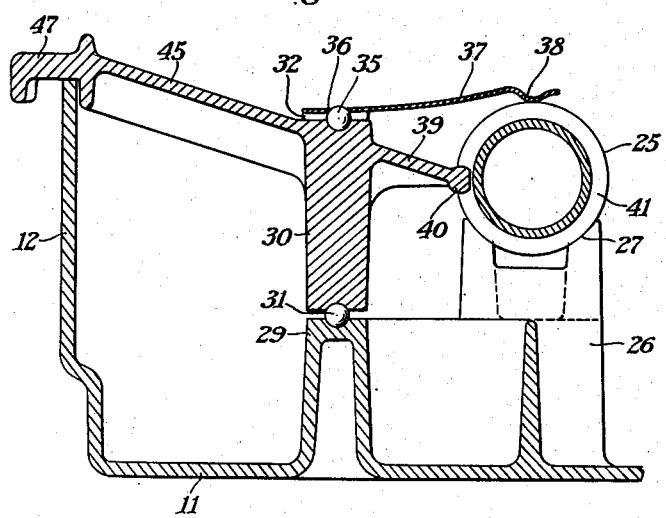
Fig. 2 is a vertical sectional view taken substantially on line 2—2 of Fig. 1, showing the focusing mechanism of the projection lens.
Figure 3:
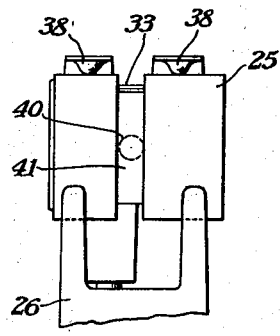
Fig. 3 is a side elevation view taken from the right side of Fig. 2.

The T-shaped focusing arm is formed with a laterally-projecting portion 39 which extends from the right of the stem 30, as viewed in Fig. 2, and which terminates in a ball-like end 40 positioned in a circumferential groove 41 formed in the mount 25. The end 40 and groove 41 thus provides in effect, a ball-and-socket joint between the portion 39 and the mount 25. It will now be apparent that when the stem 30 is rocked about its vertical axis, formed by the ball bearings 31 and 35, the end 40 will move in an arcuate path. Such movement serves to shift the mount 25 axially along the portion of the optical axis 42 between the two mirrors 19 and 20, the guideways 27 serving as a guide to retain the axis of the mount in registry with the optical axis 42. By means of this ball-and-socket arrangement, the arcuate movement of the end 40 is translated into a rectilinear movement of the mount, the advantages of which are obvious.

The stem 30 also has projecting laterally therefrom a second arm or portion 45 arranged in alignment with the arm 39. The arm 45 projects from the left of the stem 30, as viewed in Fig. 2, and extends through an arcuate opening 46 formed in the left side wall 12, Fig. 1. The exposed end of arm 45 is formed with a finger-operating portion 47 by which the arm 45 may be moved, as is apparent from an inspection of Fig. 1. As the arm 45 moves back and forth, the stem 30 is rocked about its vertical axis to move the arm 39 to shift the lens mount 25 as is apparent from an inspection of Fig. 1. The arm 45 is formed with an arcuate shield 48 which serves to cover the opening 46 to afford a light lock for the latter during the rocking movement of the focusing arm.

Thus the projecting lens mount 25 is yieldably retained by spring fingers 37 on the guideways 27 along which it moves when the T-shaped focusing arm is rocked along about its vertical axis to adjust the mount to bring the image of the slide to a sharp focus on the viewing screen. The focusing mechanism is simple, inexpensive to make, and comprises few parts of rugged construction. The parts may be easily and quickly assembled or dismantled.

While one embodiment of the invention has been disclosed, it is to be understood that the inventive idea may be carried out in a number of ways. This application is therefore not to be limited to the precise details disclosed, but is intended to cover all variations and modifications thereof formed within the scope of the appended claims.

I claim:

1. In a projection apparatus, the combination with a light source, a slide holder for positioning a transparent image-bearing slide in the path of the light rays from said light source, of an axially adjustable projecting lens mount positioned in the path of the rays transmitted by said image to project the image onto a viewing screen, a guideway on which said mount is supported, a lever operatively connected to said mount, a support for said lever, spring means carried by said support and engaging said mount to hold the latter yieldably on said guideway, and means cooperating with said support and spring means for rockably mounting said lever so that rocking of the latter serves to move said mount axially along said guideway to focus said image on said screen.

2. In a projection apparatus, the combination with a light source, a slide holder for positioning a transparent image-bearing slide in the path of the light rays from said light source, of an axially adjustable projecting lens mount positioned in the path of the rays transmitted by said image to project the image onto a viewing screen, a guideway on which said mount is supported, a support, a pair of spaced posts extending upwardly from said support, a pair of cantilever fingers secured to said posts and having the free ends thereof engaging said mount to hold the latter yieldably on said guideway, a member extending upwardly from said support between said posts, a strip connecting said fingers between said posts, aligned ball bearings positioned between said member and said support and between said member and said strip to provide a vertical axis about which said member may be rocked, means for connecting said member to said mount, and an operating portion for said member for moving said member about said axis to shift said mount axially to focus said image on said screen.

3. In a projection apparatus, the combination with a light source, a slide holder for positioning a transparent image-bearing slide in the path of the light rays from said light source, of an axially adjustable projecting lens mount positioned in the path of the rays transmitted by said image to project the image onto a viewing screen, a guideway on which said mount is supported, a support, a pair of spaced posts extending upwardly from said support, a strip secured to the tops of and connecting said posts, resilient fingers projecting laterally from said strip and having the free ends engaging said mount to hold said mount yieldably on said guideway, a stem interposed between said strip and support between said posts, aligned ball bearings positioned between the lower end of said stem and said support and the upper end of said stem and said strip to provide an axis about which said stem may be rocked, an arm projecting laterally from said stem and operatively connected to said mount, and an operating portion projecting laterally from said stem and in alignment with said arm so that movement of said operating portion will rock said stem about said axis to move said arm to shift said mount axially along said guideway to focus said image on said screen.

4. In a projecting apparatus, the combination with a slide holder for positioning a transparent image-bearing slide, a light source for illuminating said image, reflecting members positioned in the path of the light rays transmitted by said image to reflect the latter onto a viewing screen, of an axially adjustable projecting lens mount arranged between certain of said reflecting members, a support on which said mount is positioned for axial movement between said certain members and along the optical axis of the reflected image, a second support, a pair of spaced posts extending upwardly from said second support, a strip connecting and secured to the tops of said posts, resilient means formed from said strip and projecting laterally therefrom and engaging said mount to hold the latter yieldably on said first support, a stem arranged between said posts, means for pivotally connecting the ends of said stem to said second support and said strip to provide an axis of movement for said stem, an arm projecting laterally from said stem and having the free end thereof operatively connected to said mount, and an operating portion for said stem to rock the latter about said axis to move said arm to shift said lens mount axially on said first support to focus said image on said screen.

5. In a projecting apparatus, the combination with a slide holder for positioning a transparent image-bearing slide, a light source for illuminating said image, reflecting members positioned in the path of the light rays transmitted by said image to reflect the latter onto a viewing screen, of an axially adjustable projecting lens mount arranged between certain of said reflecting members, a support on which said mount is positioned for axial movement between said certain members and along the optical axis of the reflected image, a second support, a pair of spaced posts extending upwardly from said support, a strip connecting and secured to the tops of said posts, resilient means formed from said strip and projecting laterally therefrom and engaging said mount to hold the latter yieldably on said first support, a T-shaped member having a stem positioned between and having the ends pivotally connected to said second support and said strip to rockably mount said member, an arm of said member operatively connected to said mount, and an actuating portion on the other arm of said member so that when said member is rocked said mount will be shifted axially to focus the image on said screen.

JOHN H. EAGLE.

REFERENCES CITED

The following references are of record in the file of this patent:

UNITED STATES PATENTS

| Number | Name | Date |
|---|---|---|
| 2,085,193 | Jahraus et al. | June 29, 1937 |
| 2,159,614 | Evans et al. | May 23, 1939 |
| 2,380,829 | Eddy | July 31, 1945 |
| 2,414,867 | Gradisar et al. | Jan. 28, 1947 |